(12) United States Patent
Kim et al.

(10) Patent No.: US 8,792,607 B2
(45) Date of Patent: Jul. 29, 2014

(54) FUEL ROD ASSEMBLY AND METHOD FOR MITIGATING THE RADIATION-ENHANCED CORROSION OF A ZIRCONIUM-BASED COMPONENT

(75) Inventors: Young Jin Kim, Clifton Park, NY (US); Dennis Michael Gray, Delanson, NY (US); David William White, Wilmington, NC (US); Yang-Pi Lin, Wilmington, NC (US); Todd Charles Curtis, Schenectady, NY (US); Charles Beaty Patterson, Clovis, CA (US)

(73) Assignee: General Electric Company, Niskayuna, NY (US)

( * ) Notice: Subject to any disclaimer, the term of this patent is extended or adjusted under 35 U.S.C. 154(b) by 1133 days.

(21) Appl. No.: 12/250,699

(22) Filed: Oct. 14, 2008

(65) Prior Publication Data
US 2010/0091934 A1    Apr. 15, 2010

(51) Int. Cl.
*G21C 9/00*    (2006.01)
(52) U.S. Cl.
USPC ........... 376/305; 376/277; 376/409; 376/414; 376/416
(58) Field of Classification Search
None
See application file for complete search history.

(56) References Cited

U.S. PATENT DOCUMENTS

| | | | |
|---|---|---|---|
| 3,409,504 A * | 11/1968 | Meny et al. | 376/416 |
| 3,625,821 A | 12/1971 | Ricks | |
| 3,719,560 A * | 3/1973 | Mayers et al. | 376/442 |
| 4,022,662 A * | 5/1977 | Gordon et al. | 376/416 |
| 4,695,476 A | 9/1987 | Feild | |
| 4,880,597 A | 11/1989 | Bryan et al. | |
| 4,990,303 A | 2/1991 | Bryan et al. | |
| 5,227,129 A * | 7/1993 | Bryan et al. | 376/414 |
| 5,267,287 A * | 11/1993 | Bryan | 376/364 |
| 5,268,946 A | 12/1993 | Bryan et al. | |
| 5,469,481 A | 11/1995 | Adamson et al. | |
| 5,533,077 A | 7/1996 | Johansson et al. | |
| 5,793,830 A | 8/1998 | Kim et al. | |
| 6,128,361 A | 10/2000 | Terhune et al. | |
| 6,355,356 B1 * | 3/2002 | Hasz | 428/472 |
| 6,497,758 B1 * | 12/2002 | Hasz et al. | 106/1.05 |

(Continued)

FOREIGN PATENT DOCUMENTS

| | | |
|---|---|---|
| EP | 0225089 A1 | 6/1987 |
| EP | 0986069 A1 | 3/2000 |

(Continued)

OTHER PUBLICATIONS

Szkaradek, "Modelling the processes of Ceramic Coatings by surface laser Treatment," Lasers in Eng'g, vol. 14, 2004, pp. 153-162.*

(Continued)

*Primary Examiner* — Jack W Keith
*Assistant Examiner* — Marshall O'Connor
(74) *Attorney, Agent, or Firm* — Ann M. Agosti (57) ABSTRACT

There is provided a fuel rod assembly comprising a first component of a zirconium-based material. The first component is in contact with or is located adjacent to a second component of a material different from the zirconium-based material, e.g. a nickel-based or iron-based alloy. A coating is disposed on an outer surface of the first component, which is effective to reduce an electrochemical corrosion potential difference between the first component and the second component relative to an electrochemical corrosion potential difference between the first component and the second component without the coating.

9 Claims, 5 Drawing Sheets

(56) References Cited

U.S. PATENT DOCUMENTS

| | | | |
|---|---|---|---|
| 6,512,806 B2* | 1/2003 | Rudling et al. | 376/412 |
| 7,264,770 B2 | 9/2007 | Andresen et al. | |
| 2006/0045232 A1 | 3/2006 | Edsinger | |
| 2006/0188056 A1 | 8/2006 | Kim et al. | |

FOREIGN PATENT DOCUMENTS

| | | |
|---|---|---|
| EP | 1172460 A2 | 1/2002 |
| EP | 1933328 A2 | 6/2008 |
| JP | 2004251871 A | 9/2004 |

OTHER PUBLICATIONS

Bhuvaneswari et al., "Studies on zirconium nitride films deposited by reactive magnetron sputtering," Cryst. Res. Technol., 38, No. 12, 1047-1051 (2003).*

Pichon et al., "Zirconium nitrides deposited by dual ion beam sputtering:physical properties and growth modelling," Applied Surface Science 150 (1999) 115-124.*

Bazhanov et al., "The strucutre and electronic properties of Zr and Hf nitrides and oxynitrides," Proceedings Micro- and Nanoelectronics 2003 (Abstract).*

Camelio et al., "Transformation of the semi-transparent into the metallic phase of zirconium nitride compounds by implantation at controlled temperature—the evolution of the optical properties", Abstract, Refdoc., http://cat.inist.fr/, accessed Oct. 2, 2010.*

Anatech, TEchnology Solutions Addressing Surface Engineering Challenges, http://ww.anatechusa.com/Metal_Coating/, accessed Oct. 2, 2010.*

Luding et al., Entrpreneur, http://www.entrpreneur.com/tradejournals/article/, accessed Oct. 2, 2010.*

Merriam-Webster's Collegiate Dictionary, tenth edition, 1999, p. 730.*

U.S. Appl. No. 11/780,537.

Shadow Corrosion Mechanism of Zircaloy, SKI Report 2004:28, Mats Ullberg, Gunnar Lysell, Ann-Charlotte Nystrand, ISSN 1104-1374 ISRN SKI-R-04/28-SE.

Search Report and Written Opinion from corresponding EP Application No. 09172949.1-1556 dated Sep. 26, 2013.

* cited by examiner

FUEL ROD ASSEMBLY AND METHOD FOR MITIGATING THE RADIATION-ENHANCED CORROSION OF A ZIRCONIUM-BASED COMPONENT

FIELD OF THE INVENTION

The invention relates generally to a fuel rod assembly and a method for reducing an amount of radiation-enhanced corrosion on a zirconium-based component surface in a high temperature environment, such as a boiling water reactor (BWR).

BACKGROUND OF THE INVENTION

Known boiling water nuclear reactors are provided with a large, central core. In the typical construction, liquid water coolant/moderator flow enters the core from the bottom and exits the core as a water steam mixture from the top. The core includes many side-by-side fuel bundles. Water is introduced into each fuel bundle through a fuel bundle support casting from a high pressure plenum, which is situated below the core. Water passes in a distributed flow through the individual fuel bundles, is heated to generate steam, and exits the upper portion of the core as a two phase water steam mixture from which the steam is extracted for the generation of energy.

Typically, each fuel bundle includes a matrix of upstanding fuel rods. The fuel rods are sealed tubes, each containing fissionable material, which when undergoing a nuclear reaction, produce power generating steam. At the upper end of the matrix of upstanding fuel rods is located a so-called upper tie plate. This upper tie plate holds at least some of the fuel rods in vertical side-by-side alignment. Some of the fuel rods may be attached to both the upper tie plate and corresponding lower tie plates. Between the upper and lower tie plates, there are generally included water rods (or equivalent devices) for improvement of the water moderator to fuel ratio, particularly in the upper, highest void fraction region of the fuel bundle.

In addition, fuel bundles also include about seven or eight fuel rod spacers at varying elevations along the length of the fuel bundle. These spacers are required because the fuel rods are long (about 160 inches) and slender (about 0.4 to 0.5 inches in diameter), and would come into contact under the dynamics of fluid flow and nuclear power generation within the fuel bundles. The spacers are normally in the form of grid and include a plurality of individual spacer cells that provide appropriate restraints for each fuel rod at their respective elevations and thus prevent contact between the fuel rods and maintain the fuel rods at uniform spacing relative to one another along the length of the fuel bundle for optimum performance. Further, adjacent spacer cells are commonly joined by a common spring that biases adjacent fuel rods in opposite directions toward stops on the spacer cell.

It has been found that it is generally desirable to form the cladding tube from a zirconium-based alloy while in newer spacer designs, the spacer and stop materials are preferably formed from a nickel-based alloy, e.g. Inconel or X-750, or a Fe-based alloy, e.g. 304 SS. It has been occasionally observed that that a nickel-based alloy spacer exhibits radiation-enhanced corrosion, e.g. shadow corrosion, when a zirconium-based material is positioned adjacent thereto. This radiation-enhanced corrosion is manifested by a so-called "shadow effect" that takes the form of a region of radiation-enhanced corrosion on the zirconium-based component that occurs immediately adjacent to the shadowing component.

BRIEF DESCRIPTION OF THE INVENTION

In accordance with one aspect of the present invention, there is provided a fuel rod assembly comprising a first component comprising a zirconium-based material in contact with or located adjacent to a second component comprising a material different than the zirconium-based material. A coating is disposed on an outer surface of the first component, which is effective to reduce an electrochemical corrosion potential (ECP) difference between the first component and the second component relative to an ECP difference between the first component and the second component without the coating.

In another aspect of the invention, there is provided a method for decreasing an amount of radiation-enhanced corrosion within a fuel rod assembly comprising a first component and a second component. In the method, the first component comprises a zirconium-based material and the second component comprises a material different than the zirconium-based material, e.g. a nickel-based alloy, e.g. Inconel or X-750, or a Fe-based alloy, e.g. 304 SS. The second component is in contact with or located adjacent to the first component. The method comprises applying a coating onto an outer surface of the first component to form a coating on an outer surface thereof. The coating is effective to reduce an ECP difference between the first component and the second component relative to an electrochemical corrosion potential difference between the first component and the second component without the coating.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
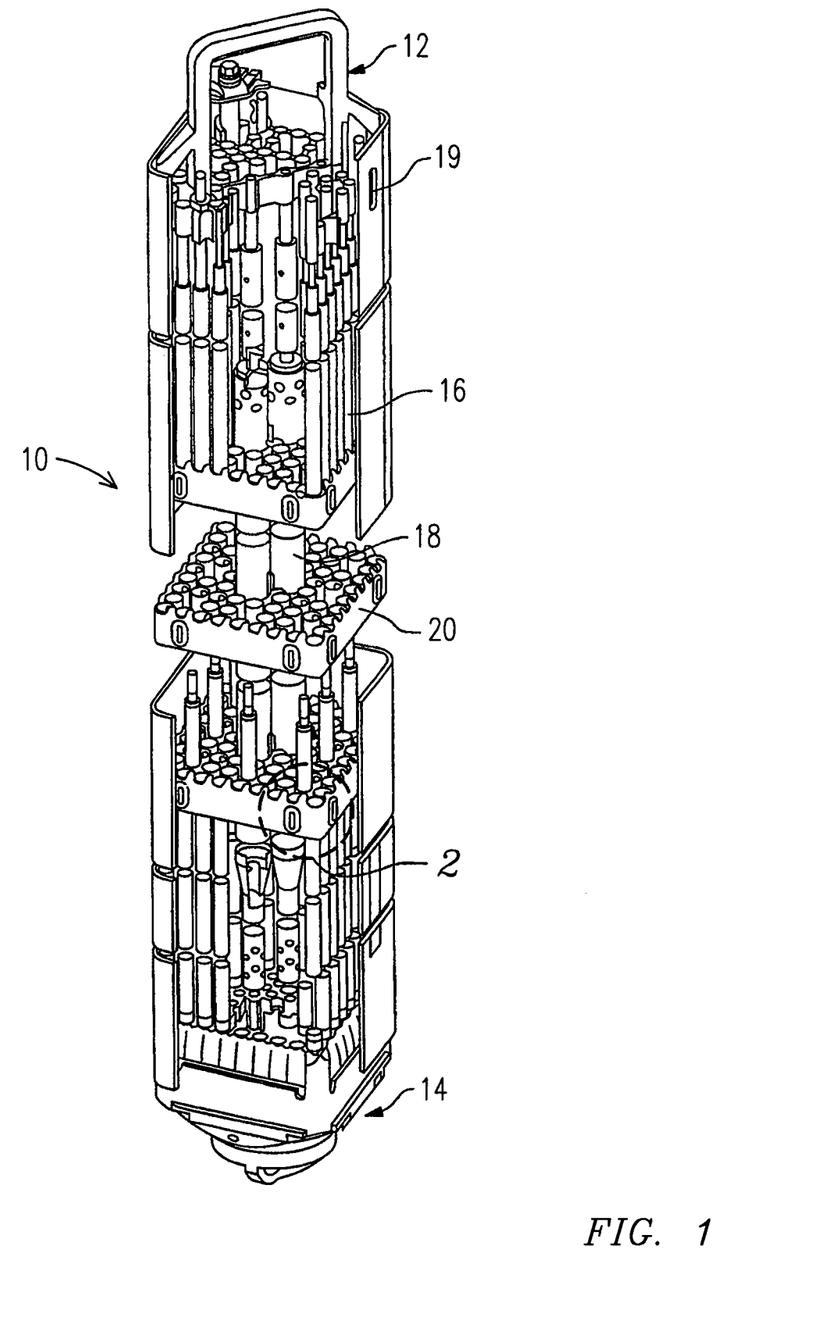
FIG. 1 is a perspective view, partly in schematic, illustrating a fuel assembly including fuel rods having a wear-inhibiting coating in accordance with the invention.

Referring to FIG. 1, a fuel assembly is indicated generally by the reference numeral 5 and typically includes a plurality of fuel bundles 10. Exemplary fuel bundle 10 is shown as including an upper tie plate 12 and a lower tie plate 14, and a plurality of fuel rods 16 therebetween. In the case of BWR assemblies, the fuel bundle 10 may contain one or more water rods 18. A plurality of spacer grids or spacers 20 are disposed along the length of the fuel rods 16 at locations between tie plates 12 and 14. In the case of BWR assemblies, the fuel bundle 10 may contain a channel structure 19 enclosing the fuel rods 16 and spacers 20.

Typically, the fuel bundle 10 includes seven or eight fuel rod spacers 20 at varying elevations along the length of the fuel bundle 10. These spacers 20 are required because the fuel rods are long (about 160 inches) and slender (about 0.4 to 0.5 inches in diameter), and would come into contact under the dynamics of fluid flow and nuclear power generation within the fuel bundles. The spacers 20 provide appropriate restraints for each fuel rod 16 at their respective elevations and thus prevent contact between the fuel rods 16 and maintain the fuel rods 16 at uniform spacing relative to one another along the length of the fuel bundle 10 for optimum performance.

Figure 2:
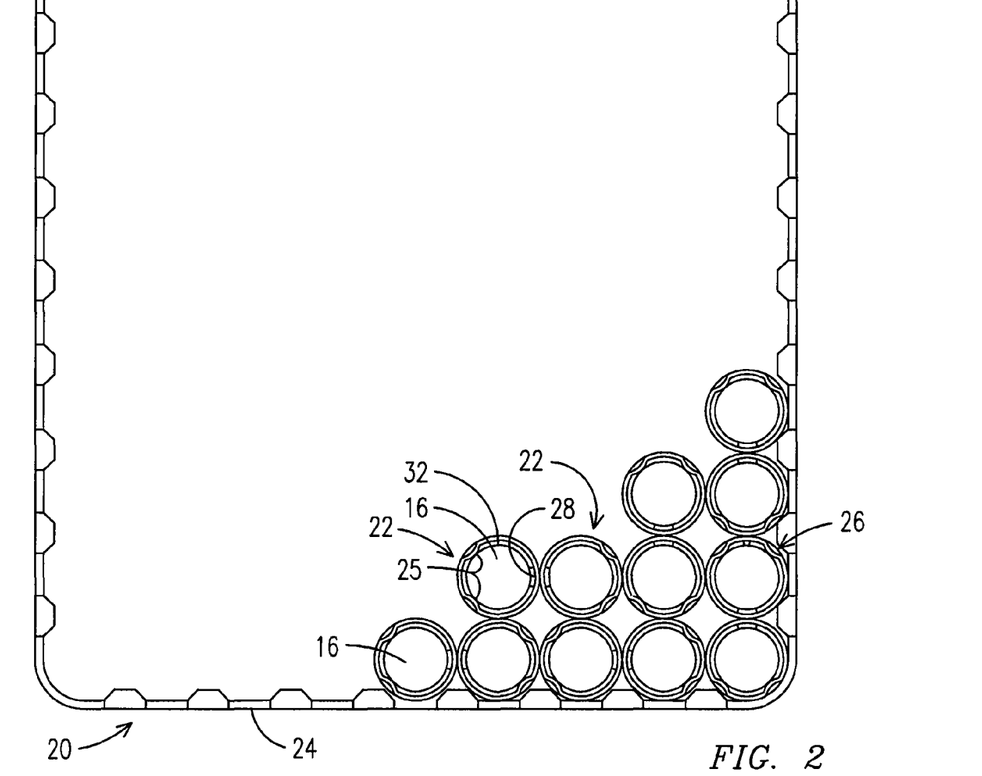
FIG. 2 is a top view showing less than all of the spacer cells of a typical spacer.
Figure 3A:
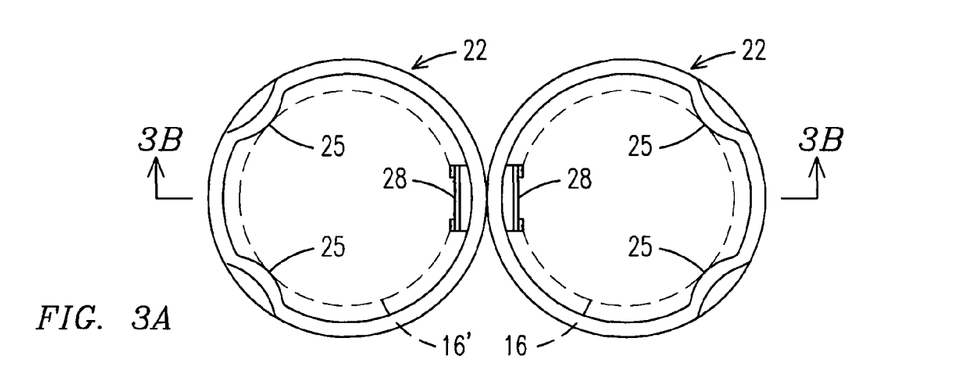
FIGS. 3A and 3B are top and elevation views respectively of paired spacer cells having a common spring.
Figure 3B:
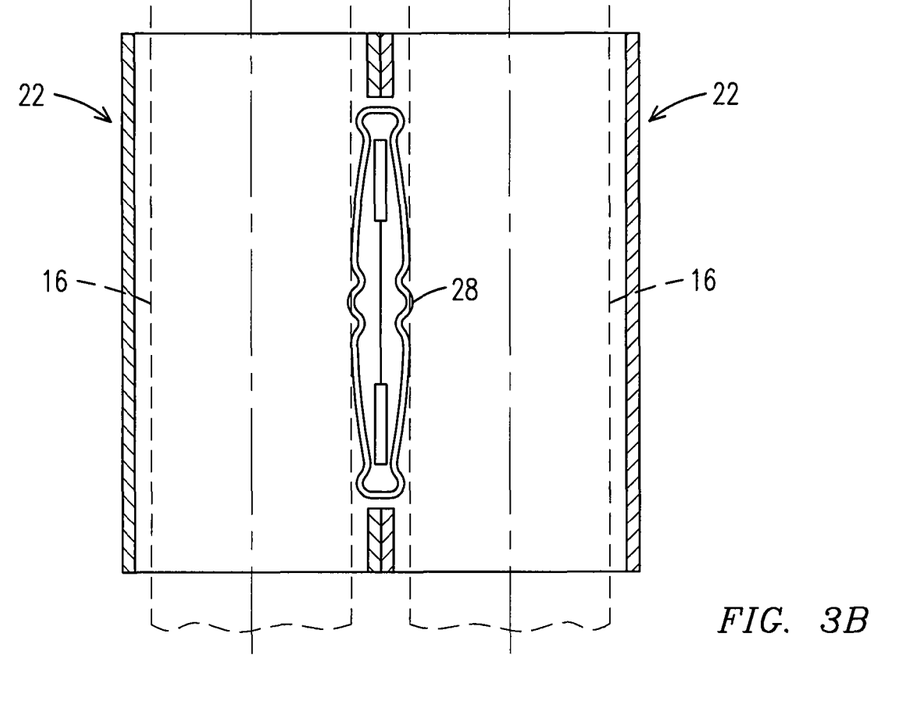

FIG. 2 shows a top view of an exemplary spacer 20 comprising a plurality of parallel cells 22 welded to each other and to a spacer band 24 to form a grid 26. Further, as shown in FIGS. 3A and 3B, each pair of adjacent spacer cells 22 are linked by a common spring 28 which biases fuel rods 12 in opposite directions toward a respective set of stops 25. The interference between the spring 28 and the fuel rods 16 is more clearly depicted in FIG. 3B, which is taken at line 3B of FIG. 3A. In this embodiment, the spring 28 exerts a force of several pounds on the surface of each fuel rod 16 while in sliding contact with the fuel rod 16.

Figure 4:
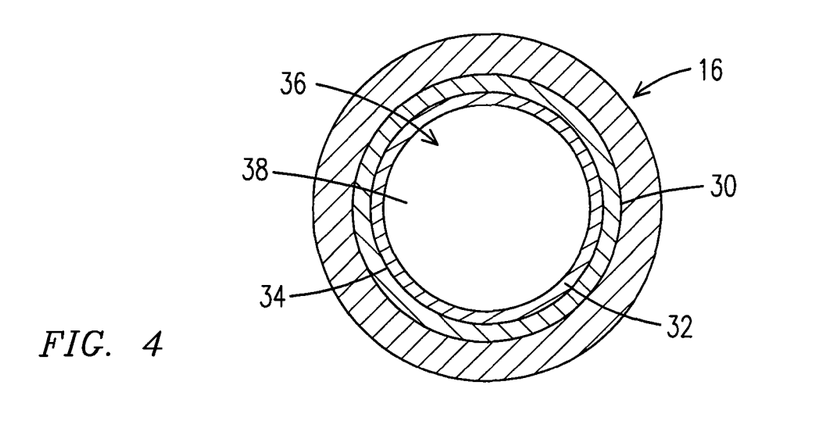
FIG. 4 is a cross-sectional view of a cladding tube having a coating thereon within a fuel rod in accordance with an embodiment of the present invention.

Referring now to FIG. 4, the fuel rod 16 is shown as including a zirconium-alloy cladding tube 30 having a coating 32 on outer surface 34 thereof. The cladding tube 30 also contains a core 36 having a quantity of fissionable material 38. The fuel rod 16 is designed to provide excellent thermal contact between the cladding tube 30 and the fissionable material 38, a minimum of parasitic neutron absorption, and resistance to bowing and vibration, which is occasionally caused by the flow of coolant at high velocity. The fissionable material 38 is typically composed of a plurality of fuel pellets of fissionable and/or fertile material. The fuel core 36 may have various shapes, such as cylindrical pellets, spheres, or small particles. Various nuclear fuels may be used, including uranium compounds, thorium compounds and mixtures thereof. One exemplary fuel is uranium dioxide or a mixture comprising uranium dioxide and plutonium dioxide.

The cladding tube 30 is commonly formed from a zirconium-based material, such as but not limited to zirconium-based alloys. Under normal conditions, zirconium-based materials are excellent for nuclear fuel claddings because they have low neutron absorption cross sections and, at temperatures below about 350° C., are strong, ductile, extremely stable and relatively nonreactive in the presence of demineralized water or steam. In one embodiment, the zirconium-based material is a zirconium-based alloy comprising various alloying elements of Sn, Fe, Ni, Cr, or, Nb, e.g., GNF-Ziron, Zircaloy-2, Zircaloy-4, Zr—Nb alloy, and the like. Zircaloys are a particular family of corrosion-resistant zirconium-based alloy materials. They are composed of 98-99% by weight zirconium, with the balance being tin, iron, chromium, and nickel. "Zircaloy-2" and "Zircaloy-4" are two widely-used zirconium-based alloys for cladding. Zircaloy-2 has on a weight basis about 1.2 to 1.7 percent tin; 0.07-0.20 percent iron; 0.05-0.15 percent chromium; and 0.03 to 0.08 percent nickel. Zircaloy-4 has essentially no nickel and about 0.21% iron, but is otherwise substantially similar to Zircaloy-2.

A second component formed from a material different than the zirconium-based material of the cladding tube 30 is in contact with or located adjacent to the cladding tube 30 in a typical BWR or PWR (pressure nuclear reactor). By "adjacent," it is meant that a first component, e.g. cladding tube 30, is within such a distance from a second component formed from a different material than the first component that a potential difference is formed between the two components as will be explained below. In the case of a BWR, shadow corrosion generally occurs when a cladding tube 30, for example, is placed within 5 mm of the second component. In one embodiment, the second component is one or more of the spacer 20, stops 25, or a spring 28 as described above. Alternatively, the second component may be any one or more of a spacer of a different design than described above, a spacer spring, a control rod blade, a screw joint, top and bottom plates, core grids, in a BWR or PWR, or any other fundamental component of a fuel assembly or reactor. The spacer 20, stops 25, and/or spring 28 are typically formed from a nickel-based alloy because of the mechanical strength and integrity of such alloys. Suitable nickel-based alloys include Inconel X-750 or X-718. Alternatively, the second component may comprise a Fe-based alloy, such as 304 or 316 stainless steel (SS 304 or SS 316).

In the above described configuration, the zirconium-based component, e.g. cladding tube 30, is susceptible to at least electrochemical corrosion and resulting structural damage. Electrochemical corrosion is caused by a flow of electrons from anodic to cathodic areas on metallic surfaces. The ECP is a measure of the thermodynamic tendency for corrosion phenomena to occur, and is a fundamental parameter in determining rates of electrochemical corrosion. The ECP is also referred to as the kinetic balance of various oxidation and reduction reactions on a metal surface placed in an electrolyte. The ECP may be decreased, for example, by reducing the concentration of oxidants such as dissolved oxygen. However, in high temperature environments (e.g. BWR environments), the high temperature water may have elevated concentration of oxidizing species, such as hydrogen peroxide and oxygen thereby promoting an increased ECP of the components.

A first component in the high temperature environment, e.g. cladding tube 30, is typically formed from a zirconium-based material and has a markedly different ECP than the second component in contact with or located adjacent to the cladding tube 30 when the second component is of a different material, such as X-750. When there exists a difference in the ECP's of two adjacent metals, a potential difference or galvanic cell forms where charged particles are transferred from one metal (e.g. Zircaloy) to the other (e.g. a nickel-based alloy, such as X-750). The result is a corrosion of one of the metals, which in this case is the zirconium-based material of a first component (e.g. cladding tube 30). The greater the ECP difference, the greater the potential for corrosion, particularly in the presence of radiation as in a nuclear environment.

The inventors have surprisingly found that the application of the coating 32 to the outer surface 34 of a first component, e.g. cladding tube 30, results in decreasing the difference of ECP between the first component (cladding tube 30) and a second component formed from a material different than the zirconium-based material. For example, the coating 32 of the present invention is effective to provide the same or a similar electrochemical corrosion potential, e.g. within about 10%, on the cladding tube 30, for example, as on the corresponding second component, e.g. a spacer 20, stops 25, and/or a spring 28 formed from X-750 (for example). As a result, the application of the coating 32 may decrease the susceptibility of the components to radiation-enhanced corrosion, e.g. shadow corrosion. In one embodiment, the coating 32 comprises at least one component selected from the group consisting of NiCrAlY, NiCr, $Cr_2O_3$, $Cr_3C_2$, Ni, FeCrAlY, FeCr, and combinations thereof. In a particular embodiment, the coating comprises at least one of NiCrAlY and/or FeCrAlY.

The coating 32 may have a thickness of from about 0.1 microns to about 10 mil, and in one embodiment, from about 2 to about 3 mil. Further, the coating 32 may be applied to an outer surface 34 of the cladding tube 30 in one or more areas or zones where shadow corrosion is expected to occur. In one embodiment, the coating 32 is applied to the areas of the cladding tube 30 just adjacent to the spacer 20. Optionally, the coating 32 may further include a ductile metal to provide additional hardness, wear resistance, and/or adhesion properties to the coating 32.

Figure 5:
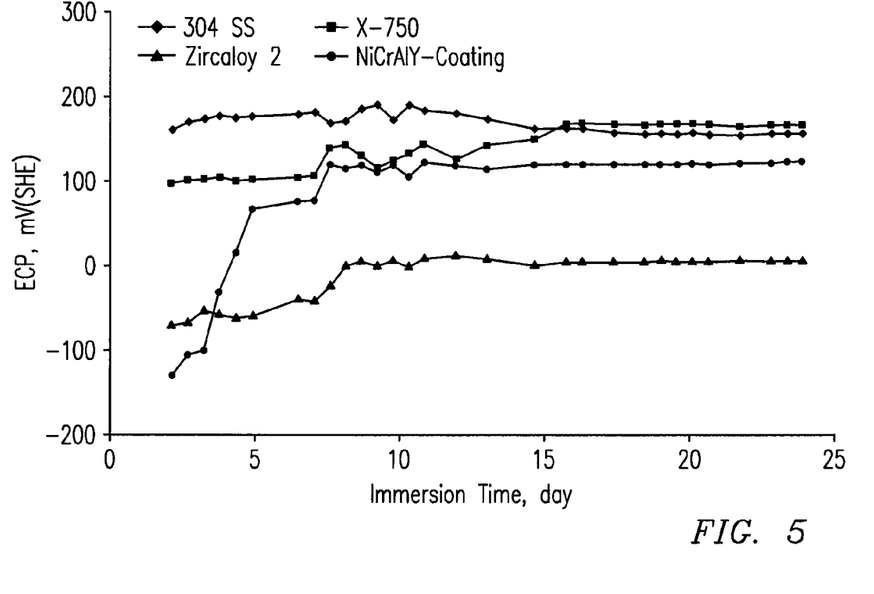
FIG. 5 is a graph comparing the ECP values for 304-SS, X-750, Zircaloy-2, and NiCrAlY-coated Zircaloy-2.
Figure 6:
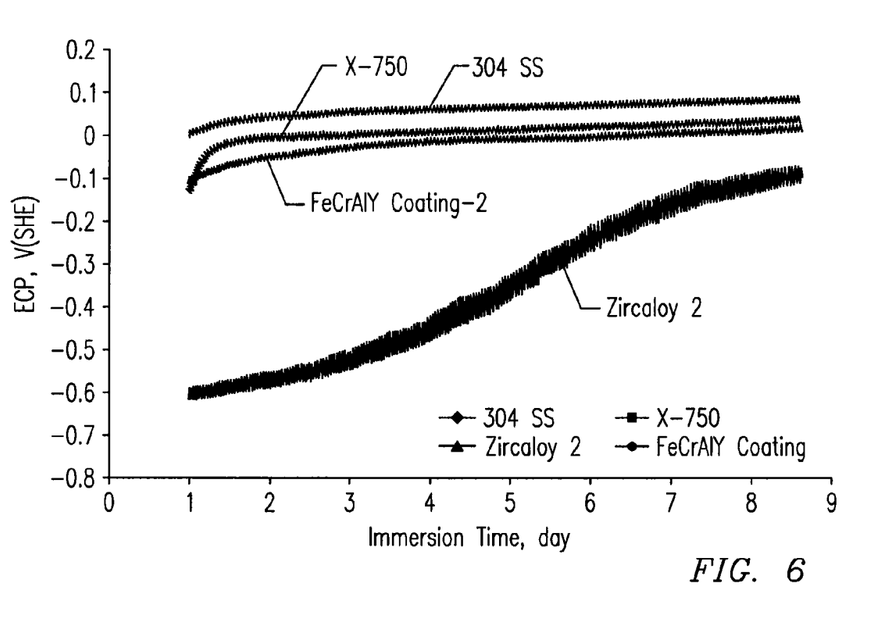
FIG. 6 is a graph comparing the ECP values for 304-SS, X-750, Zircaloy-2, and FeCrAlY-coated Zircaloy-2.

FIG. 5 illustrates the ECP of various materials, including Zircaloy-2, 304 Stainless Steel, X-750 and NiCrAlY-coated Zircaloy-2. As can be seen, Zircaloy-2 and X-750 have a markedly different ECP. However, the NiCrAlY coating 32 on Zircaloy-2 shifts the ECP of the cladding tube 30 (when the coating 32 is applied thereon) to values close to X-750 and 304 Stainless Steel. Similarly, FIG. 6 illustrates the ECP of various materials, including Zircaloy-2, 304 Stainless Steel, X-750 and FeCrAlY-coated Zircaloy-2. In the same manner as set forth above with respect to the NiCrAlY coating, the FeCrAlY coating 32 on Zircaloy-2 shifts the ECP of the cladding tube 30 (when the coating 32 is applied thereon) to values close to X-750 and 304 Stainless Steel. In this way, the coating 32 will eliminate or greatly reduce the electrochemical corrosion potential (ECP) gradient of the dissimilar metals and thus eliminate the radiation-induced corrosion (e.g. shadow corrosion) that is known to accelerate during plant operation. Further, the coating 32 will not allow or will greatly reduce the galvanic couple of a Zircaloy cladding tube 30, for example, and a second component, e.g. spacer 20, stops 25 and/or spring 28, formed from a different material in a high temperature water environment.

Figure 7:
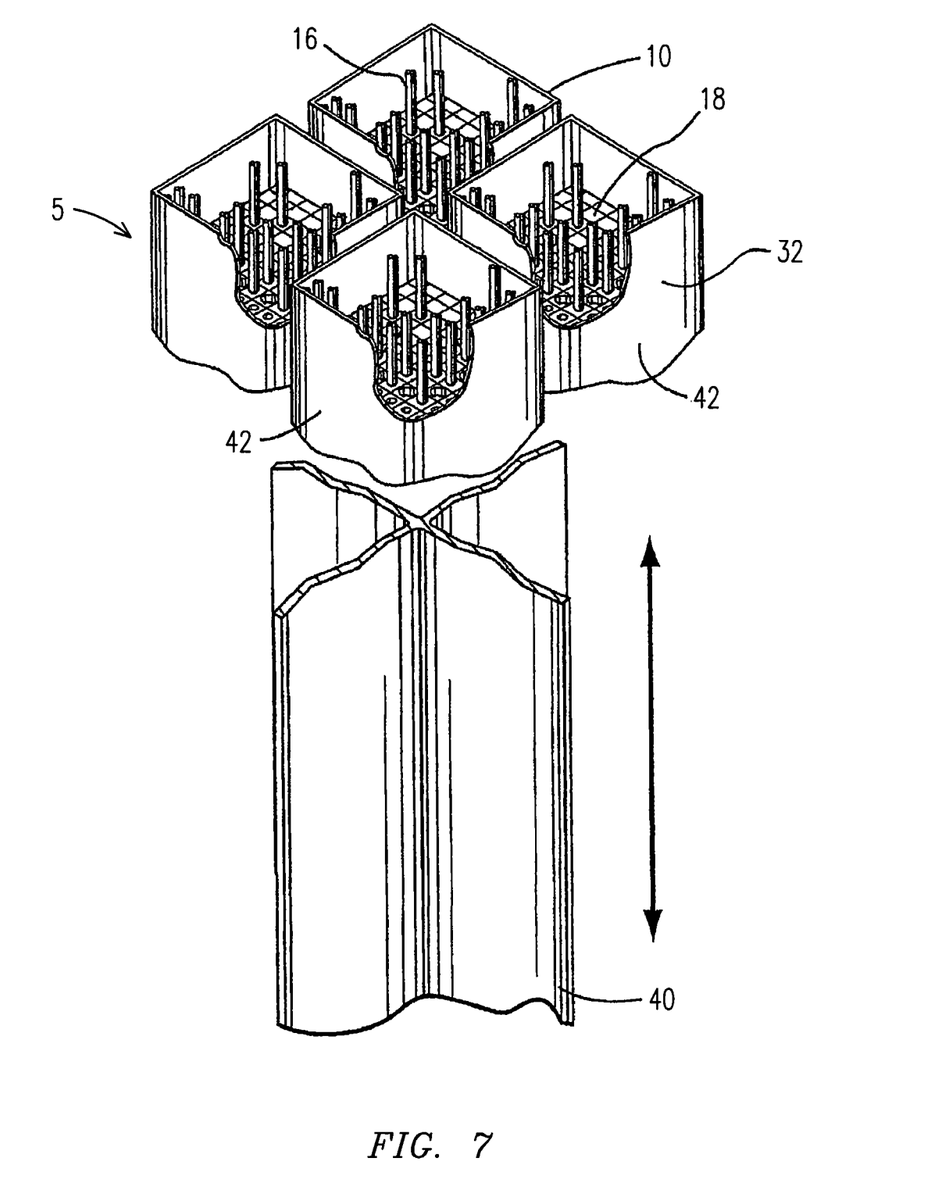
FIG. 7 is a perspective view of a control blade and an associated fuel assembly in accordance with one aspect of the present invention.

In yet another embodiment, the coating 32 may be applied to a control blade 40 adjacent to one or more fuel channels 42 to reduce the potential difference between the control blade 40 and a corresponding fuel channel 42 when the components 42, 44 are formed from different materials. In the typical arrangement, as shown in FIG. 5, a control blade 40 is associated with a fuel assembly 5 as described above comprised of four fuel bundles 10. The fuel bundle 10 includes fuel rods 16 and vertically spaced spacers 20 as shown and as described above. Fuel channels 42 surround each fuel bundle 10 and define a cruciform opening between the fuel bundles 10.

In an embodiment of the present invention, the fuel channels 42 (first component) may be formed from a zirconium-based material (e.g. a Zircaloy) as described above while the control blade 40 may be formed from a different material, e.g. a Ni-based or Fe-based material. In this embodiment, one or more of the fuel channels 42 may be coated, whole or in part, with the coating 32 of the present invention to provide the same or a similar electrochemical corrosion potential, e.g. within about 10%, on the coated fuel channel 42 as on the control blade 40. In one embodiment, the coating 32 comprises at least one component selected from the group consisting of NiCrAlY, NiCr, $Cr_2O_3$, $Cr_3C_2$, Ni, FeCrAlY, FeCr, and combinations thereof. In a particular embodiment, the coating comprises at least one of NiCrAlY and/or FeCrAlY. Alternatively, the coating 32 may be applied to any zirconium-based component in the fuel rod assembly 5 or a nuclear reactor that is adjacent to or in contact with a component formed from a different material, which causes a potential difference therebetween.

In general, the shadow corrosion-inhibiting coating 32 may be applied to the cladding tube 30 or any other zirconium-based component (e.g. control blade 40) using known processes dependent on the materials being applied to the cladding tube. For example, in the case where the coating 32 comprises a single layer shown in FIG. 4, the coating 32 can be applied using a thermal spray gun and parameters specific for creating the single layer. In one embodiment, the material for the coating 32 can be applied using a thermal spray process, such as Hyper-Velocity-Oxy-Fuel) (HVOF), Hyper-Velocity-Air-Fuel (HVAF), or combinations thereof. These processes cause particles of the coating material to adhere to the cladding tube 30, for example, and to each other to form a coating. For example, the temperature used in the HVOF process was about 3000 K and an average particle velocity of about 450 m/s for metal particles of an average size of about 5 microns to about 35 microns.

In a HVOF (High Velocity Oxygen Fuel) thermal spray process, there are a number of HVOF guns that use different methods to achieve high velocity spraying. One method is basically a high pressure water cooled HVOF combustion chamber and long nozzle. In the method, fuel (kerosene, acetylene, propylene and hydrogen) and oxygen are fed into the chamber. Combustion produces a hot high pressure flame which is forced down a nozzle increasing its velocity. Powder, e.g. the material of coating 32, may be fed axially into the HVOF combustion chamber under high pressure or fed through the side of laval type nozzle where the pressure is lower.

Another HVOF method uses a simpler system of a high pressure combustion nozzle and air cap. Fuel gas (e.g. propane, propylene or hydrogen) and oxygen are supplied at high pressure, combustion occurs outside the nozzle but within an air cap supplied with compressed air. The compressed air pinches and accelerates the flame and acts as a coolant for the HVOF gun. Powder is fed at high pressure axially from the center of the nozzle. Thermal spray processes typically minimize oxidation of the particles while in the hot flame, but have enough energy to splat out on to the surface of the cladding to form a dense coating.

In another embodiment, the coating may be applied using a plasma spray process as is known in the art. Plasma spray processes typically apply the coating by spraying molten or heat-softened material onto a surface to provide a coating. The coating material, in the form of a powder, is injected into a very high temperature plasma flame, where it is rapidly heated and accelerated to a high velocity. For example, the flame temperature of a plasma torch may be about 15000 K. The hot material impacts on the substrate surface and rapidly cools forming a coating. This plasma spray process carried out correctly can be called a "cold process" (relative to the substrate material being coated) as the substrate temperature can be kept low during processing avoiding damage, metallurgical changes, and distortion to the substrate material.

In one embodiment, a plasma spray gun is utilized that comprises a copper anode and tungsten cathode, both of which are water cooled, plasma gases (argon, nitrogen, hydrogen, helium) flow around the cathode and through the anode which is shaped as a constricting nozzle. The plasma is initiated by a high voltage discharge which causes localized ionization and a conductive path for a DC arc to form between cathode and anode. The resistance heating from the arc can cause the gas to reach an extreme temperature, dissociate, and ionize to form plasma. The plasma exits the anode nozzle as a free or neutral plasma flame (plasma which does not carry electric current), which is quite different from a Plasma Transferred Arc coating process where the arc extends to the surface to be coated. When the plasma is stabilized and ready for spraying, the electric arc extends down the nozzle, instead of shorting out to the nearest edge of the anode nozzle. This stretching of the arc is due to a thermal pinch effect. Cold gas around the surface of the water cooled anode nozzle being electrically non-conductive constricts the plasma arc, raising its temperature and velocity. The coating material is fed into the plasma flame most commonly via an external powder port mounted near the anode nozzle exit. The powder is so rapidly heated and accelerated that spray distances can be in the order of about 25 mm to about 150 mm (about 0.984 inches to about 5.906 inches).

In another embodiment, the coating 32 may be applied via a wire arc coating process. In a wire arc coating process, two wires with an electrical potential are brought together at an angle of about 20 degrees. A current is drawn through the wires and they melt the coating material to be applied at the wires' point of contact. An atomizing gas propels the molten particles at the substrate at low velocity.

Alternatively, the coating 32 may be applied using a coating technique known in the art, such as chemical vapor deposition (CVD), electron beam physical vapor deposition, sputtering, pulsed laser deposition, electroplating, electrophoretic deposition, electroless coating, or any other suitable method.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements and/or operational relationships that do not differ from the literal language of the claims, or if they include equivalent structural elements and/or operational relationships with insubstantial differences from the literal language of the claims.

The invention claimed is:

1. A method for decreasing an amount of radiation-enhanced corrosion within a fuel rod assembly comprising:
   applying a metallic coating onto an outer surface of a first component of the fuel rod assembly, wherein the first component comprises a zirconium-based material;
   wherein the metallic coating reduces an electrochemical corrosion potential difference between the first component and a second component of the fuel rod assembly as compared to an electrochemical corrosion potential difference between the first component and the second component without the metallic coating; and
   wherein the second component is in contact with or located adjacent to the first component, and wherein the second component comprises a material different from the first component.

2. The method of claim 1, wherein the metallic coating comprises a component selected from the group consisting of NiCrAlY, NiCr, $Cr_2O_3$, $Cr_3C_2$, Ni, FeCrAlY, FeCr, and combinations thereof.

3. The method of claim 2, wherein the metallic coating comprises at least one of NiCrAlY or FeCrAlY.

4. The method of claim 1, wherein the first component is at least one of a cladding tube or a fuel channel.

5. The method of claim 1, wherein the second component is at least one of a spacer, stops, a spring, or a control blade, and wherein the second component comprises a nickel-based alloy or an iron-based alloy.

6. The method of claim 1, wherein the metallic coating has a thickness from about 0.1 microns to about 10 mil.

7. The method of claim 6, wherein the metallic coating has a thickness from about 2 to about 3 mil.

8. The method of claim 1, further comprising adding a binding agent to the metal coating to assist in adhering the metallic coating onto the outer surface of the cladding tube.

9. The method of claim 1, wherein the applying step is done by at least one of a thermal spray process, a plasma spray deposition process, a wire arc coating process, chemical vapor deposition, electron beam physical vapor deposition, sputtering, pulsed laser deposition, electroplating, electrophoretic deposition, or electroless coating.

* * * * *

UNITED STATES PATENT AND TRADEMARK OFFICE
CERTIFICATE OF CORRECTION

PATENT NO. : 8,792,607 B2
APPLICATION NO. : 12/250699
DATED : July 29, 2014
INVENTOR(S) : Young Jin Kim et al.

Page 1 of 1

It is certified that error appears in the above-identified patent and that said Letters Patent is hereby corrected as shown below:

On the Title Page, References Cited

On page 2, Item (56), under "OTHER PUBLICATIONS", in Column 2, Line 1, "strucutre" should read -- structure --; in line 9, "http://ww." should read -- http://www. --.

In the Specification

Column 2, line 54, after "FIG. 1", insert -- and FIG. 7 --.

Column 3, line 9, insert -- A section 2 of spacer 20 is shown in more detail in FIG. 2 --; in line 14, "28" should read -- 28, --; and "fuel rods 12" should read -- fuel rods 16 --.

Column 5, line 32, "44" should read -- 40 --; in line 33, "FIG. 5" should read -- FIG. 7 --.

Signed and Sealed this
Eighth Day of September, 2015

Michelle K. Lee
*Director of the United States Patent and Trademark Office*